US011377859B2

(12) United States Patent
Wilson et al.

(10) Patent No.: US 11,377,859 B2
(45) Date of Patent: Jul. 5, 2022

(54) FILM FOR FLOOR COVERINGS

(71) Applicant: The Amtico Company Limited, Coventry (GB)

(72) Inventors: Gary Wilson, Coventry (GB); Christopher Hart, Coventry (GB); Rhiann Coles, Coventry (GB); Steven Lawrence, Coventry (GB)

(73) Assignee: The Amtico Company Limited, Coventry (GB)

( * ) Notice: Subject to any disclaimer, the term of this patent is extended or adjusted under 35 U.S.C. 154(b) by 148 days.

(21) Appl. No.: 16/635,622

(22) PCT Filed: Jul. 27, 2018

(86) PCT No.: PCT/GB2018/052112
§ 371 (c)(1),
(2) Date: Jan. 31, 2020

(87) PCT Pub. No.: WO2019/025764
PCT Pub. Date: Feb. 7, 2019

(65) Prior Publication Data
US 2021/0123246 A1    Apr. 29, 2021

(30) Foreign Application Priority Data

Jul. 31, 2017    (GB) .................................... 1712295

(51) Int. Cl.
*E04F 15/10*    (2006.01)
*B32B 19/04*    (2006.01)
(Continued)

(52) U.S. Cl.
CPC ............ *E04F 15/107* (2013.01); *B32B 7/022* (2019.01); *B32B 19/045* (2013.01); *B32B 27/08* (2013.01); *E04F 15/105* (2013.01); *B32B 2307/404* (2013.01); *B32B 2307/412* (2013.01); *B32B 2307/536* (2013.01); *B32B 2307/584* (2013.01)

(58) Field of Classification Search
CPC ...... E04F 15/107; B32B 19/045; B32B 27/08; B32B 2307/412; B32B 2307/536; B32B 2307/584
See application file for complete search history.

(56) References Cited

U.S. PATENT DOCUMENTS

| 4,183,777 A | 1/1980 | Summers et al. |
| 5,547,741 A * | 8/1996 | Wilson .................... C08L 27/06 428/215 |

(Continued)

FOREIGN PATENT DOCUMENTS

| CN | 103228439 A | 7/2013 |
| CN | 103862775 A | 6/2014 |

(Continued)

*Primary Examiner* — Elizabeth E Mulvaney
(74) *Attorney, Agent, or Firm* — Verrill Dana, LLP

(57) ABSTRACT

The invention relates to a film for use in a resilient floor covering, wherein the film comprises (a) a first layer and (b) a second layer and wherein the first layer has a Shore D hardness of 60 to 80 at 20° C. and the second layer has a Shore D hardness of 40 to 65 at 20° C. Also provided is a composite laminate floor covering comprising the film of the invention. Also provided is a floor tile comprising the film of the invention.

23 Claims, 2 Drawing Sheets

(51) Int. Cl.
    *B32B 27/08*    (2006.01)
    *B32B 7/022*    (2019.01)

(56) References Cited

U.S. PATENT DOCUMENTS

| | | | |
|---|---|---|---|
| 6,103,044 | A | 8/2000 | Harwood et al. |
| 2011/0284710 | A1 | 11/2011 | Wallace et al. |
| 2014/0170359 | A1 | 6/2014 | Schwitte et al. |
| 2018/0015704 | A1* | 1/2018 | Ko .......................... B32B 19/04 |
| 2019/0145109 | A1* | 5/2019 | Esbelin .................. B32B 27/20 |
| | | | 428/213 |

FOREIGN PATENT DOCUMENTS

| | | | |
|---|---|---|---|
| WO | 1994021721 | A1 | 9/1994 |
| WO | 1997018939 | A1 | 5/1997 |
| WO | 1997018949 | A1 | 5/1997 |
| WO | 2012046051 | A1 | 4/2012 |
| WO | 2016042142 | A1 | 3/2016 |

* cited by examiner

FILM FOR FLOOR COVERINGS

FIELD OF THE INVENTION

The present invention is directed to a film for a resilient floor covering and methods of making such a film. The present invention further provides a resilient floor covering comprising said film and methods of making such floor coverings.

BACKGROUND OF THE INVENTION

Resilient floor coverings, which include for example vinyl tiles and vinyl sheet, are well known. There are described for example in an article entitled "Flooring Materials" in Encyclopedia of Polymer Science and Engineering, Wiley-Interscience, Volume 7 (1987), pages 233-247.

Such floor coverings, as described in the above article, are composite materials. A particular example of such floor coverings are vinyl tile floor coverings which are usually a composite material constructed from a number of layers which are laminated together. The uppermost layer, which is commonly called the wear layer, is typically a clear or translucent layer. The undermost layer of the composite is commonly referred to as the backing layer and may comprise one or more backing layers. A printed patterned film is generally interposed between the wear layer and a first backing layer.

A durable good appearance for a floor covering is often desired. It is important that the uppermost layer of floor coverings is formulated for good resistance to abrasion and wear. Although vinyl flooring products have proved to be durable, they nevertheless tend to lose gloss and visible abrasion, scratching and scuffing marks tend to appear through wear. Traditionally a lot of focus has been on the urethane lacquer technology to impart scratch resistance (interpreted herein after to include resistance to general abrasion and scuffing as well as scratch). Urethane or enhanced urethane coating/s are typically applied to the wear layer to further protect against wear and provide the desired sheen for the product. Aluminium oxide is sometimes added to the urethane coating to enhance scratch resistance.

Scratch resistance is a property that is constantly trying to be improved within the floor coverings industry. Accordingly, the manufacturers of such materials have long sought to find improved floor coverings which exhibit improved durability and scratch resistance.

Volatile Organic Compounds (VOC) are chemical constituents of many construction products, including flooring products. Due to their volatility, it is possible for these compounds to be released from flooring products into the surrounding atmosphere during the product lifetime. Concerns over the possible effects that VOC may have on human health have led many countries to impose restrictions on the VOC content of construction products in order to limit their potential release. Some jurisdictions only limit the VOC emissions that are actually released. Floor coverings with low volatile organic compounds emission are therefore desirable.

Accordingly, the films of the invention provide improved scratch-resistance properties and reduced VOC emission, particularly when the film is used in floor coverings. Another objective of the present invention is to provide floor coverings with an improved scratch resistance character and reduced VOC emission.

SUMMARY OF THE INVENTION

In a first aspect the present invention provides a film for use in a resilient floor covering, wherein the film comprises (a) a first layer and (b) a second layer and wherein the first layer has a Shore D hardness of 60 to 80 at 20° C. and the second layer, or an area thereof, has a Shore D hardness of 40 to 65 at 20° C.

In a second aspect there is provided a composite laminate resilient floor covering comprising the film according to the first aspect of the invention.

In a third aspect the present invention provides a floor tile comprising the film of the first aspect of the invention.

DETAILED DESCRIPTION OF THE INVENTION

The present invention relates to a film for use in a resilient floor covering, wherein the film comprises (a) a first layer and (b) a second layer of specific hardness. In particular, the first layer has a Shore D hardness of 60 to 80 at 20° C. and the second layer, or an area thereof, has a Shore D hardness of 40 to 65 at 20° C.

Hardness may be defined as a material's resistance to indentation. Shore Hardness is measured using the durometer scale defined by Albert Ferdinand Shore, who developed a device to measure Shore hardness in the 1920s. The two most common scales, using slightly different measurement systems, are the ASTM D2240 type A and type D scales. The A scale is for softer plastics, while the D scale is for harder ones. Hardness of the layers of the film of the present invention are measured using the D scale.

In one embodiment the first layer of the film according to the invention has a Shore D hardness of 65 to 80 at 20° C., or a Shore D hardness of 60 to 75 at 20° C., or a Shore D hardness of 65 to 75 at 20° C., or a Shore D hardness of 60 to 70 at 20° C.

In one embodiment the second layer, or an area thereof, of the film according to the invention has a Shore D hardness of 45 to 65 at 20° C., or a Shore D hardness of 50 to 65 at 20° C., or a Shore D hardness of 50 to 60 at 20° C.

The World Health Organization (WHO), defines a volatile organic compound (VOC) as, any organic compound with a boiling point in the range from (50° C. to 100° C.) to (240° C. to 260° C.), corresponding to having saturation vapour pressures at 25° C. greater than 100 kPa, as detailed in ISO 16000-6. Within Europe, the regulations are based on Total VOC (TVOC) as defined in ISO 16000-6 and in EN 16516 as the sum of all VOCs or alternatively sum of all detected volatile organic compounds, sampled on Tenax TA, which elute from a non-polar or slightly polar gas chromatographic separation column between and including n-hexane and n-hexadecane (n-C6-n-C16), measured by mass selective detector (MSD), and quantified as toluene equivalent. This in effect covers all organic compounds with boiling range of around 68° C. to 287° C. This definition is the mostly used for VOC emission testing throughout the world.

The films of the present invention have surprisingly been found to have good scratch and wear resistance and to give rise to reduced VOC emissions.

It has been found that the combination of the specific hardness of the first layer and second layer, or an area thereof, generates a synergistic effect on the scratch resistance properties of the film.

Films for resilient floor coverings containing too little plasticiser have generally been found to exhibit unsatisfactory scratch resistance. Surprisingly, it has been found that the combination of a first layer having a particular hardness achieved through a fairly low level of plasticiser placed on the top of the second layer, or an area thereof, of a lesser hardness give rise to an improved toughness and scratch resistance.

It has also been found that in the films of the present invention the use of a first layer as described herein gives rise to a significant reduction in VOC emission.

In one embodiment the first layer of the film comprises a plasticiser.

In one embodiment the total amount of plasticiser in the first layer is 20% w/w or less, such as 18% w/w or less, or 16% w/w or less, or 14% w/w or less, or 12% w/w or less. It may be that the first layer comprises a plasticiser in an amount from 0 to 20% w/w, such as from 0 to 18% w/w, or from 0 to 16% w/w, or from 0 to 14% w/w, or from 0 to 12% w/w. It may, for example, be from 0.1 to 20% w/w, such as from 0.1 to 18% w/w, or from 0.1 to 16% w/w, or from 0.1 to 14% w/w, or from 0.1 to 12% w/w, or from 0.1 to 11% w/w, or for example, from 1 to 20% w/w, or 1 to 16% w/w, or 1 to 14% w/w, or from 1 to 11% w/w, or from 3 to 20% w/w, or from 3 to 15% w/w, or from 3 to 12% w/w, or from 3 to 11% w/w, or from 3 to 10% w/w, or from 3 to 8% w/w based on the total weight of the first layer.

In one embodiment the second layer of the film comprises a plasticiser.

In one embodiment the second layer comprises a plasticiser in an amount from 7 to 40% w/w, such as from 8 to 40% w/w, or from 9 to 40% w/w, or from 10 to 40% w/w. It may, for example, be from 7 to 38% w/w, such as from 8 to 38% w/w, or from 9 to 38% w/w, or from 10 to 38% w/w. It may be that the second layer comprises a plasticiser in an amount from 7 to 36% w/w, such as from 8 to 36% w/w, or from 9 to 36% w/w, or from 10 to 36% w/w, or from 8 to 30% w/w, or from 10 to 30% w/w, or from 11 to 30% w/w, or from 8 to 25% w/w, or from 11.5 to 25% w/w, or from 12 to 25% w/w, or from 8 to 20% w/w, or from 11 to 20% w/w, or from 11.5 to 20% w/w, based on the total weight of the second layer.

Any suitable plasticiser may be used in the first and second layer.

In one embodiment the plasticiser is a non-phthalate plasticisers. Preferably the plasticiser is selected from dioctyl terephthalate (DOTP) or 1,2-cyclohexane dicarboxylic acid diisononyl ester (e.g. hexamoll DINCH/Elatur CH).

In one embodiment the first layer has a thickness from 12 µm to 600 µm, more preferably from 12 µm to 550 µm, or from 12 µm to 525 µm, or from 12 µm to 500 µm, or from 25 µm to 600 µm, or from 25 µm to 550 µm, or from 25 µm to 525 µm, or from 25 µm to 500 µm, or from 25 µm to 400 µm. Preferably, the first layer has a thickness from 30 µm to 600 µm, or from 30 µm to 550 µm, or from 40 µm to 600 µm, or from 40 µm to 550 µm, or from 40 µm to 380 µm, or from 40 µm to 200 µm, or from 40 µm to 100 µm. It may be that the first layer has a thickness from 50 µm to 600 µm, or from 50 µm to 550 µm, or from 50 µm to 525 µm, or from 50 µm to 500 µm, or from 50 µm to 450 µm. It may be that the first layer has a thickness from 100 µm to 600 µm, preferably from 100 µm to 550 µm, or from 100 µm to 525 µm, or from 100 µm to 450 µm, or from 100 µm to 360 µm, or from 200 µm to 400 µm, or from 250 µm to 360 µm, or from 300 µm to 360 µm.

In one embodiment the second layer has a thickness of 125 µm or more, preferably of 200 µm or more, more preferably of 250 µm or more. It may be that the second layer has a thickness from 125 µm to 1500 µm, or from 200 µm to 1500 µm, from 250 µm to 1500 µm, or from 300 µm to 1500 µm, or from 200 µm to 1200 µm, or from 200 µm to 1000 µm, or from 200 µm to 900 µm. It may be that the second layer has a thickness of from 250 µm to 1200 µm, or from 250 µm to 1000 µm, or from 250 µm to 900 µm, or from 250 µm to 600 µm, or from 330 µm to 1200 µm, or from 330 µm to 1000 µm, or from 330 µm to 900 µm.

It is believed that the thickness of the first layer should not be above 600 µm, preferably should not be above 550 µm, more preferably should not be above 525 µm, so the properties of the second layer can contribute to the scratch resistance of first layer when the film is in use. It has been surprisingly found that the scratch resistance of the films of the present invention improves when the thickness of the first layer is reduced.

It is believed that when the thickness of the second layer is greater than 250 µm, only the 250 µm having a Shore D hardness of 40 to 65 at 20° C. positioned in use beneath the first layer contributes to the scratch resistance improvement and the remainder of the second layer can have a Shore D hardness outside this range.

In one embodiment the first layer is clear or translucent.

In one embodiment the first layer is rigid.

The first layer may further comprise a thermoplastic polymer. Examples of suitable thermoplastic polymers include vinyl resin or vinyl polymer, ethylene methacrylate (EMA), ethylene vinyl acetate (EVA), or any other olefinic polymers, for example polyurethane (PU) or acrylonitrile butadiene styrene (ABS). Preferably the first layer comprises PVC resin.

Compositions which comprise PVC resin are commonly referred to as PVC compositions or simply as PVC. They are based on homopolymers or copolymers of vinyl chloride, which are both commonly referred to as PVC resins or PVC polymers.

In one embodiment the total amount of thermoplastic polymer (e.g. PVC resin) in the first layer is from 60 to 98% w/w, such as from 64 to 88% w/w, or from 68 to 98% w/w, or from 72 to 98% w/w, based on the total weight of the first layer.

In one embodiment the second layer further comprises a thermoplastic polymer. Examples of suitable thermoplastic polymers used in the second layer include vinyl resin or vinyl polymer, ethylene methacrylate (EMA), ethylene vinyl acetate (EVA), or any other olefinic polymers, for example polyurethane (PU) or acrylonitrile butadiene styrene (ABS). Preferably the second layer comprises polyvinyl chloride resin (PVC resin).

In one embodiment the total amount of thermoplastic polymer (e.g. PVC resin) in the second layer is from 15 to 95% w/w, such as from 15 to 90% w/w, or from 15 to 85% w/w, or from 20 to 95% w/w, or from 20 to 90% w/w, or from 20 to 85% w/w, based on the total weight of the second layer.

The thermoplastic polymer used in each of the first and second layers may be the same or different.

The first layer and the second layer may comprise any other suitable materials. The first layer and the second layer can additionally comprise other ingredients such as stabilizers, including heat and UV stabilizers, process aids, lubricants, antioxidants and mineral fillers.

In one embodiment the first layer comprises, a thermoplastic polymer, one or more stabilizers and a process aid, and optionally a plasticiser. Preferably the thermoplastic polymer is polyvinyl chloride resin (PVC). The one or more stabilizers may include a secondary stabilizer, a heat stabilizer, a UV stabiliser or combinations thereof.

In one embodiment the second layer comprises a plasticiser, a thermoplastic polymer, one or more stabilizers and a process aid. Preferably the thermoplastic polymer is polyvinyl chloride resin (PVC). The one or more stabilizers may include a secondary stabilizer, a heat stabilizer, a UV stabiliser or combinations thereof.

The secondary stabiliser may have stabilising and/or plasticising benefits. In one embodiment the secondary stabiliser is epoxidised soyabean oil (ESBO).

The first layer may be a single layer or a combination of two layers or more. In one embodiment the first layer may be a combination of two layers, wherein one of these two layers is a printed layer. In one embodiment the first layer may comprise a third layer and a printed layer. So the film of the invention may comprise a first layer and a second layer, wherein the first layer comprises a single layer or a combination of a third layer and a printed layer.

When the first layer comprises a single layer, this single layer may comprise any of the components and concentrations of the first layer described above and can have the characteristics (e.g. thickness, hardness and scratch resistance) of said first layer.

When the first layer comprises a third layer and a printed layer, each of the third layer and printed layer can comprise any of the components and ingredients of the first layer described above.

When the first layer comprises a third layer and a printed layer, the total amount of plasticiser and thermoplastic polymer (e.g. PVC) of both of these layers is as described above for the first layer.

When the first layer comprises a third layer and a printed layer, the combination of the third layer and printed layer may have the thickness of the first layer described above (e.g. from 12 µm to 600 µm, more preferably from 12 µm to 550 µm, or from 12 µm to 525 µm, or from 12 µm to 500). For example, the third layer may have a thickness from 100 µm to 550 µm and the printed layer from 50 µm to 150 µm, but the total thickness of both layers is the thickness of the first layer described above.

When the first layer comprises a third layer and a printed layer, each of these two layers has a Shore D hardness of 60 to 80 at 20° C. For example, the third layer may have a Shore D hardness of 60 to 80, or 60 to 75, or 65 to 75, or 65 to 70 at 20° C. and the printed layer may have a Shore D hardness of 60 to 80, or 60 to 75, or 65 to 75, or 65 to 70, 60 to 70 at 20° C.

In one embodiment, the third layer is clear or translucent.

In one embodiment, the third layer is rigid.

In one embodiment, the third layer comprises a thermoplastic polymer, one or more stabilizers and a process aid, and optionally a plasticiser. Preferably the thermoplastic polymer is polyvinyl chloride resin (PVC). The one or more stabilizers may include a secondary stabilizer, a heat stabilizer, a UV stabiliser or combinations thereof.

The second layer may be a wear layer or a backing layer. The second layer may comprise a wear layer and a backing layer. So the film of the invention may comprise a first layer and a wear layer, or a first layer and a backing layer, or a first layer, a wear layer and a backing layer.

Thus, the film of the present invention for use in a resilient floor covering may have a first layer positioned on the top of the second layer, wherein said second layer may be a wear layer, a backing layer, or combinations thereof.

The film of the present invention for use in a resilient floor covering may also have a first layer positioned on the top of the second layer, wherein said first layer may be a single layer, or a combination of a third layer and a printed layer, and wherein said second layer may be a wear layer, a backing layer, or combinations thereof.

As explained above, it is believed that only the 250 µm with a Shore D hardness 40 to 65 at 20° C. positioned in use beneath the first layer has an influence on the scratch performance. For example, the second layer could comprise a wear layer of 100 µm and a backing layer of 200 µm, or a wear layer of 300 µm, or a backing layer of 300 µm, however only the 250 µm positioned in use beneath the first layer needs to have a hardness of 40-65 Shore D at 20° C., the remainder of the second layer can have a Shore D hardness outside this range.

In one embodiment the second layer may be a wear layer, wherein said wear layer comprises a plasticiser, a thermoplastic polymer, one or more stabilizers and a process aid. Preferably the thermoplastic polymer is polyvinyl chloride resin (PVC). The one or more stabilizers may include a secondary stabilizer, a heat stabilizer, a UV stabiliser or combinations thereof.

In one embodiment the second layer is a backing layer, wherein said backing layer comprises a plasticiser, a thermoplastic polymer, one or more stabilizers, one or more fillers and a process aid. Preferably the thermoplastic polymer is polyvinyl chloride resin (PVC). The one or more stabilizers may include a secondary stabilizer, a heat stabilizer, a UV stabiliser or combinations thereof.

When the film comprises a second layer having a wear layer and a backing layer, the wear layer and the backing layer may comprise any of the components describe above.

In one embodiment the wear layer is a clear layer.

When the film comprises a backing layer, the backing layer may contain one or more mineral fillers. These fillers can be platelet or non-platelet fillers.

Suitable platelet fillers can include but are not limited to kaolin, talc, mica and graphite.

Suitable non-platelet fillers include but are not limited to calcium carbonate (for example chalk and limestone), dolomite, magnesium hydroxide, ATH, magnesium, carbonate, calcium sulphate, $SiO_2$, Feldspar and glass beads.

The film composition may also have other layers typically found in floor coverings.

When the film of the invention is used in a resilient floor covering and the film comprises a second layer having a wear layer and a backing layer, this configuration may further include a printed pattern layer positioned between the wear layer and the backing layer.

The film of the present invention may be manufactured using conventional co-extrusion, calendering and spread coating equipment and processes.

A typical procedure for the manufacture of the film of the present invention suitable for floor coverings is calendering.

The present invention further provides a composite laminate resilient floor covering comprising the film described herein above.

The present invention further provides a floor tile comprising the film described herein above.

The composite laminates or the floor coverings comprising a film according to the invention may have a first layer and a second layer wherein the second layer is a wear layer and the first layer is positioned over the second layer. Beneath the wear layer there may be provided an optional pattered printed layer which may be positioned between the wear layer and a backing layer. Additional layers may be present under the backing layer.

The composite laminates or the floor coverings comprising a film according to the invention may have a first layer and a second layer wherein the second layer is a wear layer and a backing layer and the first layer is positioned over the second layer. There may be provided an optional patterned printed layer which may be positioned between the wear layer and a backing layer. Additional layers may be present under the backing layer.

The composite laminates or the floor coverings comprising a film according to the invention may have a first layer and a second layer wherein the first layer is a third layer and a printed layer and the third layer is positioned over the printed layer and the printed layer is positioned over the second layer. The second layer may be a wear layer and/or a backing layer. Additional layers may be present under the backing layer.

The composite laminate or floor covering may be provided with a urethane lacquer on the upper surface of the first layer.

DESCRIPTION OF THE DRAWINGS

A number of embodiments of the invention will now be further described, by means of example only, with reference to the drawings, in which.

Examples of films of the invention are shown in FIGS. 1a, 1b, 1c and 3.

Figure 1A:
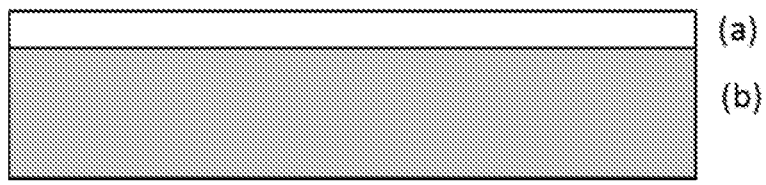
FIGS. 1a, 1b and 1c are cross sections of a film according to the present invention, showing the layers.
Figure 1B:
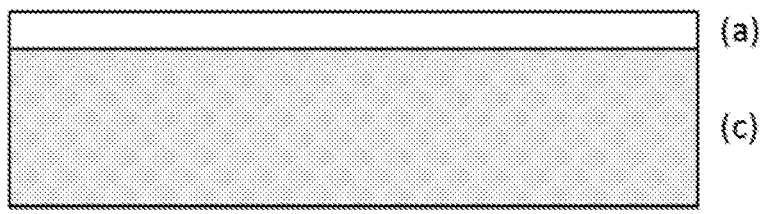
Figure 1C:
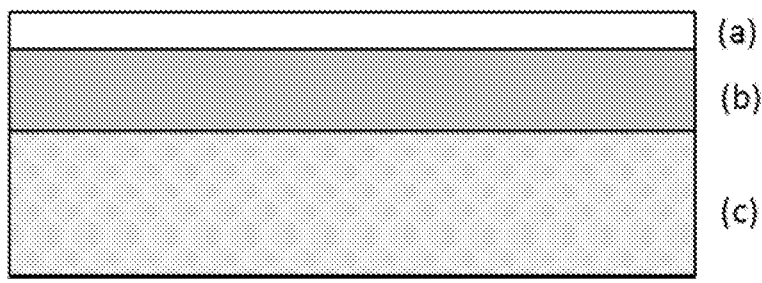

FIG. 1a illustrates a film in accordance with the present invention having an upper first layer (a) and a second layer being a wear layer (b). FIG. 1b illustrates a film in accordance with the present invention having an upper first layer (a) and a second layer being a backing layer (c). FIG. 1c illustrates a film in accordance with the present invention having an upper first layer (a) and a second layer comprising a wear layer (b) and a backing layer (c) positioned beneath the wear layer (b).

In each of FIGS. 1a, 1b and 1c the first layer (a) has a thickness of from 50 to 380 μm.

In each of FIGS. 1a, 1b and 1c the first layer (a) has a Shore D hardness of 60 to 80, for example from 65 to 75, at 20° C.

In FIG. 1a the second layer is a wear layer (b) and in FIG. 1b the second layer is a backing layer (c) where these second layers have a thickness of at least 250 μm. The Shore D hardness of the second layers (b) and (c), or at least the upper 250 μm of each of these layers, is 40 to 65, from example 50 to 60 at 20° C.

In FIG. 1c the second layer comprises a combination of a wear layer (b) and a backing layer (c). The second layer has a thickness of at least 250 μm. The Shore D hardness of the second layer, or at least the upper 250 μm of this layer, is 50 to 60 at 20° C.

Figure 2:
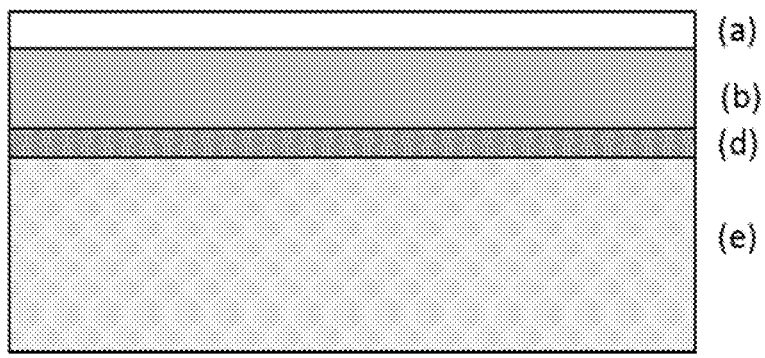
FIG. 2 is a cross section of a tile, composite laminate or portion of a floor covering having a film according to the present invention.

FIG. 2 illustrates a floor tile, composite laminate or a portion of a floor covering comprising a film according to the present invention as shown in FIG. 1a, a decorative layer in the form of a printed patterned layer (d) positioned beneath the wear layer (b). Positioned beneath the printed patterned layer (d) there is a backing layer (e).

In FIG. 2, the first layer (a) has a thickness of 152 μm, the wear layer (b) has a thickness of 508 μm, the printed layer (d) has a thickness of 50 μm and the backing layer (e) has a thickness of 838 μm.

Figure 3:
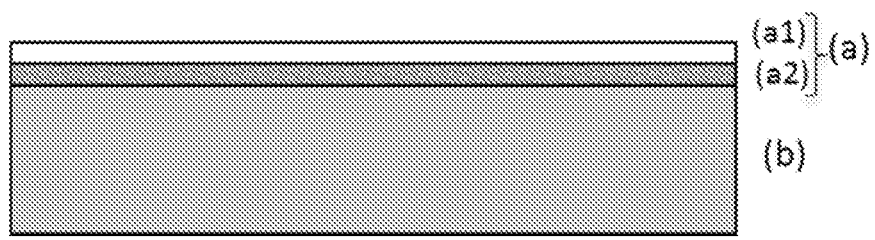
FIG. 3 is a cross section of a film according to the present invention.

FIG. 3 illustrates a film in accordance with the present invention having an upper first layer (a) being a third layer (a1) and a printed layer (a2) and a second layer being a wear layer (b).

In FIG. 3 the third layer (a1) has a thickness of 152 μm and the printed layer (a2) has thickness of 76 μm. Each of these layers ((a1) and (a2)) forming the first layer (a) has a Shore D hardness between 60 to 80 at 20° C.

The scratch improvements of the films according to the inventions were demonstrated using an Elcometer 3092 Sclerometer Hardness Tester. A luxury vinyl tile with a standard hardness first layer typically shows white scratching with forces of around 8-14 N, however with the film according to present invention at the surface this is improved to 16-24 N (sclerometer test is emboss dependent and these ranges apply to smooth embosses). In addition as mentioned above the reduction of the thickness of the first layer has been found to have an effect on the scratching performance of the film, so the scratch resistance improves when the thickness of the first layer is reduced.

Example 1: Film Composition

|  | Film 1 w/w % |
| --- | --- |
| First Layer (a): | |
| PVC resin | 84.3 |
| Plasticiser | 6.3 |
| Secondary stabiliser | 5.0 |
| Heat stabiliser | 1.9 |
| UV stabiliser | 0.4 |
| Process aid | 2.1 |
| Second Layer: Wear Layer (b): | |
| PVC resin | 76.1 |
| Plasticiser | 15.2 |
| Secondary stabiliser | 4.8 |
| Heat stabiliser | 1.7 |
| UV stabiliser | 0.3 |
| Process aid | 1.9 |

The first layer (a) of film 1 has a thickness of 254 μm and a Shore D hardness of 65-75 at 20° C. The second layer of film 1 is a clear wear layer (b) having thickness of 254 μm and a Shore D hardness of 50-60 at 20° C.

Example 2: Film Composition

|  | Film 2 w/w % |
| --- | --- |
| First Layer (a): | |
| PVC resin | 84.3 |
| Plasticiser | 6.3 |
| Secondary stabiliser | 5.0 |
| Heat stabiliser | 1.9 |
| UV stabiliser | 0.4 |
| Process aid | 2.1 |
| Second Layer: Backing Layer (c): | |
| PVC resin | 36.5 |
| Plasticiser | 11.9 |
| Secondary stabiliser | 2.2 |
| Heat stabiliser | 1.0 |

-continued

|  | Film 2 w/w % |
| --- | --- |
| Mineral filler | 47.5 |
| Process aid | 0.9 |

The first layer (a) of film 2 has a thickness of 254 μm and a Shore D hardness of 65-75 at 20° C. The second layer of film 2 is a backing layer (b) with thickness of 254 μm and a Shore D hardness of 50-60 at 20° C.

Example 3: Film Composition

|  | Film 3 w/w % |
| --- | --- |
| First Layer (a): |  |
| PVC resin | 84.3 |
| Plasticiser | 6.3 |
| Secondary stabiliser | 5.0 |
| Heat stabiliser | 1.9 |
| UV stabiliser | 0.4 |
| Process aid | 2.1 |
| Second Layer: Wear Layer (b): |  |
| PVC resin | 73 |
| Plasticiser | 18.3 |
| Secondary stabiliser | 4.4 |
| Heat stabiliser | 2.0 |
| UV stabiliser | 0.4 |
| Process Aid | 1.9 |
| Second Layer: Backing Layer (c): |  |
| PVC resin | 36.5 |
| Plasticiser | 11.9 |
| Secondary stabiliser | 2.2 |
| Heat stabiliser | 1.0 |
| Mineral filler | 47.5 |
| Process aid | 0.9 |

The first layer (a) of film 3 has a thickness of 254 μm and a Shore D hardness of 65-75 at 20° C. The second layer of film 3 is a combination of a wear layer (b) with a thickness of 127 μm and a backing layer (c) with a thickness of 127 μm. In the second layer the wear layer (b) has a Shore D hardness of 50-52 at 20° C. and the backing layer (c) has a Shore D hardness of 50-60 at 20° C.

Example 4: First Layer Composition

|  | First Layer w/w % |
| --- | --- |
| Third Layer (a1): |  |
| PVC resin | 84.3 |
| Plasticiser | 6.3 |
| Secondary stabiliser | 5.0 |
| Heat stabiliser | 1.9 |
| UV stabiliser | 0.4 |
| Process aid | 2.1 |
| Printed Layer (a2): |  |
| PVC | 77.5 |
| Plasticiser | 3.9 |
| Pigment | 7.7 |
| Acrylic Modifier | 10.1 |
| Stabiliser | 0.8 |

The first layer has a third layer (a1) with a thickness of 254 μm and a Shore D hardness of 65-75 at 20° C. and a printed layer (a2) with a thickness of 76 μm and a Shore D hardness of 60-70 at 20° C.

Example 5: Tile

A floor covering was prepared by laminating together in the following sequence:
(1) an upper 254 μm first layer having the composition of the first layer (a) of film 1,
(2) a 508 μm wear layer having the composition of the second layer (b) of film 1,
(3) a 76 μm pattered printed layer
(4) a 768.5 μm filled backing layer.

Example 6: Scratch Resistance

Floor coverings with and without a film according to the present invention were compared to study the effect of having a first layer with a D hardness of 60 to 80 at 20° C. and having a second layer with a D hardness of 40 to 65 at 20° C. The scratch resistance was determined using an Elcometer 3092 Sclerometer Hardness Tester.

TABLE 1

| Details of upper two layers of tile | Thickness (μm) | Hardness | Force required to get white scratching |
| --- | --- | --- | --- |
| Tile 1: |  |  |  |
| First layer | 50.8 | 65-75D | 20N |
| Second layer | 254 | 50-60D |  |
| Tile 2 (comparative): |  |  |  |
| First layer | 360 | 50-55D | 12N |
| Second layer | 550 | 50-60D |  |
| Tile 3 (comparative): |  |  |  |
| First layer | 508 | 65-75D | 15N |
| Second layer | 254 | 70-75D |  |

Table 1 shows that a tile (Tile 1) having a film according to the present invention has improved scratch resistance than tiles with a film having a Shore D hardness of the first layer outside the range of 60 to 80 at 20° C. or a Shore D hardness of the second layer outside the range of 40 to 65 at 20° C. The scratch performance of a tile (Tile 2) with a Shore D hardness of the first layer below 60 was significantly decreased. Likewise the scratch performance of a tile (Tile 3) with a Shore D hardness of the second layer above 65 was also significantly decreased.

Example 7: Scratch Resistance

Three films (films 4-6) having the compositions set forth for film 1 and different thickness were prepared and the scratch resistance of their first layer was determined using an Elcometer 3092 Sclerometer Hardness Tester.

TABLE 2

| | Thickness (μm) | Hardness | Force required to get white scratching |
|---|---|---|---|
| Film 4: | | | |
| First layer | 50.8 | 65-75D | 20N |
| Second layer | 254 | 50-60D | |
| Film 5: | | | |
| First layer | 381 | 65-75D | 18N |
| Second layer | 254 | 50-60D | |
| Film 6: | | | |
| First layer | 508 | 65-75D | 16N |
| Second layer | 254 | 50-60D | |

Table 2 shows that the scratch performance benefits of films according to the invention declined when the thickness of the first layer is increased.

Example 8: VOC Emissions

TABLE 3

| Parameters | Tile 2 (comparative) | Tile with film of the invention |
|---|---|---|
| TVOC (3 Days, μg/m³) | 250-700 | 133 |
| TSVOC (3 Days, μg/m³) | 0-10 | 0 |
| R value (3 Days, μg/m³) | 0.5-1 | 0.088 |
| VOC (Without LCI, 3 Days, μg/m³) | 10-100 | 37 |
| Carcinogenic Compounds (C1A, C1B 3 Days, μg/m³) | 0 | 0 |
| Formaldehyde (3 Days, μg/m³) | 0-5 | 0 |
| TVOC (28 Days, μg/m³) | 300-400 | <200 |
| TSVOC (28 Days, μg/m³) | 6 | <10 |
| R value (28 Days, μg/m³) | 0.5-1 | <0.1 |
| VOC (Without LCI, 28 Days, μg/m³) | 8 | <10 |
| Carcinogenic Compounds (C1A, C1B 28 Days, μg/m³) | None detected | None detected |
| Formaldehyde (28 Days, μg/m³) | 0.004 | None detected |

A floor covering (luxury vinyl tile) having a film according to the present invention and a luxury vinyl tile with a standard first layer were subjected to VOC release measurements according to ISO 16000-6. The floor covering having a film according to the present invention displayed a significant reduction in VOC after 28 days.

The invention claimed is:

1. A film for use in a resilient floor covering, wherein the film comprises (a) a first layer and (b) a second layer, wherein the second layer comprises a wear layer and/or a backing layer, and an uppermost layer is the first layer positioned on the top of the second layer, and wherein the first layer has a Shore D hardness of 65 to 80 at 20° C. and the second layer has a Shore D hardness of 40 to 60 at 20° C.

2. The film of claim 1, wherein the first layer comprises a plasticiser.

3. The film of claim 1, wherein the thickness of the first layer is from 12 to 600 microns.

4. The film of claim 1, wherein the first layer is a rigid layer.

5. The film of claim 1, wherein the first layer comprises a thermoplastic polymer.

6. The film of claim 1, wherein the first layer comprises a thermoplastic polymer and said thermoplastic polymer is PVC resin.

7. The film of claim 1, wherein the second layer comprises a plasticiser.

8. The film of claim 1, wherein the thickness of the second layer is 125 microns or more.

9. The film of claim 1, wherein the second layer comprises a thermoplastic polymer.

10. The film of claim 1, wherein the second layer comprises a thermoplastic polymer and said thermoplastic polymer is PVC resin.

11. The film of claim 1, wherein the first layer comprises a third layer and a print layer.

12. The film of claim 1, wherein the backing layer comprises one or more platelet type fillers.

13. The film of claim 1, wherein the backing layer comprises non-platelet fillers.

14. The film of claim 13, wherein the non-platelet filler comprises calcium carbonate, dolomite, magnesium hydroxide, ATH, magnesium, carbonate, calcium sulphate, $SiO_2$, feldspar and glass beads.

15. The film of claim 1, wherein the wear layer is a clear layer.

16. A composite laminate resilient floor covering comprising the film according to claim 1.

17. A floor tile comprising the film according to claim 1.

18. The composite laminate according to claim 16, wherein the first layer comprises a combination of a third layer and a printed layer and the uppermost layer is the third layer which is positioned on the top of the printed layer and the printed layer is positioned on the top of the wear layer or the backing layer.

19. The film of claim 1, wherein the first layer comprises a plasticiser in a total amount of 20% w/w or less, based on the total weight of the first layer.

20. The film of claim 1, wherein the second layer comprises a plasticiser in a total amount from 7 to 40% w/w, based on the total weight of the second layer.

21. The film of claim 1, wherein the first layer comprises a thermoplastic polymer, and wherein said thermoplastic polymer is selected from polyvinyl chloride resin or polymer (PVC), ethylene methacrylate (EMA), ethylene vinyl acetate (EVA), polyurethane (PU) and acrylonitrile butadiene styrene (ABS).

22. The film of claim 1, wherein the second layer comprises a thermoplastic polymer, and wherein said thermoplastic polymer is selected from polyvinyl chloride resin or polymer (PVC), ethylene methacrylate (EMA), ethylene vinyl acetate (EVA), polyurethane (PU) and acrylonitrile butadiene styrene (ABS).

23. The floor tile according to claim 17, wherein the first layer comprises a combination of a third layer and a printed layer and the uppermost layer is the third layer which is positioned on the top of the printed layer and the printed layer is positioned on the top of the wear layer or the backing layer.

* * * * *